US010318840B2

(12) United States Patent
Yeskel et al.

(10) Patent No.: US 10,318,840 B2
(45) **Date of Patent: *Jun. 11, 2019**

(54) GENERATING A GROUP PHOTO COLLECTION

(71) Applicant: Google LLC, Mountain View, CA (US)

(72) Inventors: Zachary Yeskel, Tarrytown, NY (US); Tina Chen, San Francisco, CA (US); Kavi Harshawat, San Francisco, CA (US); Matthew Steiner, Mountain View, CA (US); Denise Ho, Los Altos, CA (US); AJ Asver, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/583,907

(22) Filed: May 1, 2017

(65) Prior Publication Data

US 2017/0331865 A1 Nov. 16, 2017

Related U.S. Application Data

(63) Continuation of application No. 13/895,742, filed on May 16, 2013, now Pat. No. 9,641,572.

(Continued)

(51) Int. Cl.

| | |
|---|---|
| ***H04L 29/06*** | (2006.01) |
| ***G06K 9/46*** | (2006.01) |
| ***G06Q 50/00*** | (2012.01) |

(52) U.S. Cl.

CPC .......... *G06K 9/4671* (2013.01); *G06Q 50/01* (2013.01)

(58) Field of Classification Search

CPC ..... H04L 65/403; G06K 9/4671; G06Q 50/01

See application file for complete search history.

(56) References Cited

U.S. PATENT DOCUMENTS

| | | | | |
|---|---|---|---|---|
| 7,778,973 B2 | 8/2010 | Choi et al. | | |
| 7,796,779 B1 * | 9/2010 | Strong | G06T 11/60 | 382/100 |

(Continued)

FOREIGN PATENT DOCUMENTS

| | | | |
|---|---|---|---|
| KR | 20030061752 A * | 7/2003 | |
| WO | WO-2007117448 A3 * | 10/2008 | G06F 17/30244 |
| WO | WO-2012064532 A1 * | 5/2012 | G06F 17/30247 |

OTHER PUBLICATIONS

Anonymous, "Sharypic: Collaborative Group Photo Album to Gather All Pictures from an Event", http://www.makeuseof.com/dirisharypic - collaborative - photo - album/, Oct. 25, 2011, 3 pages.

*Primary Examiner* — Kostas J Katsikis
(74) *Attorney, Agent, or Firm* — IP Spring

(57) ABSTRACT

Implementations generally relate to generating a group photo collection. In some implementations, a method includes determining a plurality of users in a specified group of users of a social network system. The method also includes receiving photos associated with the users. The method also includes providing an interface enabling the plurality of users to collaborate in creating a group photo collection, where the group photo collection includes the plurality of photos. The method also includes providing one or more recommendations to create a photo album based on one or more themes, where the one or more themes are based on patterns of objects recognized in the plurality of photos.

20 Claims, 3 Drawing Sheets

100

Related U.S. Application Data

(60) Provisional application No. 61/648,498, filed on May 17, 2012.

(56) References Cited

U.S. PATENT DOCUMENTS

| | | | | |
|---|---|---|---|---|
| 8,478,662 | B1 * | 7/2013 | Snodgrass | G06Q 30/02 705/26.7 |
| 8,925,106 | B1 | 12/2014 | Steiner et al. | |
| 9,122,912 | B1 | 9/2015 | Briskin et al. | |
| 9,235,575 | B1 | 1/2016 | Xiao et al. | |
| 2002/0140843 | A1 | 10/2002 | Tretter et al. | |
| 2002/0183984 | A1 | 12/2002 | Deng et al. | |
| 2005/0111737 | A1 | 5/2005 | Das | |
| 2006/0053364 | A1 | 3/2006 | Hollander et al. | |
| 2006/0153460 | A1 | 7/2006 | Kim et al. | |
| 2008/0005091 | A1 * | 1/2008 | Lawler | G06F 17/30592 |
| 2008/0040673 | A1 | 2/2008 | Zuckerberg et al. | |
| 2008/0069480 | A1 | 3/2008 | Aarabi et al. | |
| 2008/0275881 | A1 | 11/2008 | Conn et al. | |
| 2009/0216806 | A1 | 8/2009 | Feuerstein et al. | |
| 2010/0217641 | A1 | 8/2010 | Siegel | |
| 2010/0329551 | A1 | 12/2010 | Yamazaki | |
| 2011/0035678 | A1 * | 2/2011 | Hamrick | G06F 16/48 715/751 |
| 2011/0283173 | A1 | 11/2011 | Babcock et al. | |
| 2011/0288964 | A1 * | 11/2011 | Linder | B25J 9/1689 705/27.1 |
| 2012/0027294 | A1 * | 2/2012 | Krolczyk | G06T 11/60 382/165 |
| 2012/0131102 | A1 | 5/2012 | Gabos et al. | |
| 2013/0013699 | A1 | 1/2013 | Huxley | |
| 2013/0148864 | A1 * | 6/2013 | Dolson | G06K 9/00677 382/115 |
| 2013/0204710 | A1 | 8/2013 | Boland et al. | |
| 2014/0193047 | A1 * | 7/2014 | Grosz | G06F 3/1242 382/118 |
| 2014/0301653 | A1 | 10/2014 | Murphy-Chutorian et al. | |

* cited by examiner

GENERATING A GROUP PHOTO COLLECTION

CROSS REFERENCE TO RELATED APPLICATIONS

This application is a continuation of U.S. patent application Ser. No. 13/895,742, entitled "GENERATING A GROUP PHOTO COLLECTION," filed May 16, 2013, which claims priority to Provisional application No. 61/648,498 entitled "GENERATING A GROUP PHOTO COLLECTION," filed May 17, 2012, which is hereby incorporated by reference as if set forth in full in this application for all purposes.

BACKGROUND

Social network systems often enable users to upload photos and create photo albums that contain the uploaded photos. After a user uploads photos to a social network system, the social network system typically enables the user to create one or more photo albums. The user can then determine which photos to include in each of the photo albums. The social network system typically enables the user to share the photo albums with other users of the social network system. For example, a user may allow other users to access and view photos in particular photo albums.

SUMMARY

Implementations generally relate to generating a group photo collection. In some implementations, a method includes determining a plurality of users in a specified group of users of a social network system. The method also includes receiving photos associated with the users. The method also includes providing an interface enabling the plurality of users to collaborate in creating a group photo collection, where the group photo collection includes the plurality of photos. The method also includes providing one or more recommendations to create a photo album based on one or more themes, where the one or more themes are based on patterns of objects recognized in the plurality of photos.

With further regard to this method, in some implementations, the determining of the plurality of users may include receiving an indication from a user who creates a group photo collection as to which other users are in the specified group of users. In some implementations, the determining of the plurality of users may include recommending users to be added to the specified group of users. In some implementations, the method further includes enabling each user of the plurality of users to designate other users to be added to the specified group of users. In some implementations, the method further includes enabling the users to collaborate to create shared or common photo albums. In some implementations, to enable the plurality of users to collaborate, the method further includes enabling the users to collaborate to create shared or common photo albums, and where the users have privileges to create, label, and modify photo albums in the group photo collection. In some implementations, to enable the plurality of users to collaborate, the method further includes one or more of enabling the users to collaborate in order to cluster similar photos together in any one or more photo albums, enabling the users to order the photos, enabling the users to edit the photos, and enabling the users to add captions to the photos. In some implementations, the recommending is based on themes of color. In some implementations, the recommending is based on events. In some implementations, the recommending is based on time.

In another implementation, a method includes determining a plurality of users in a specified group of users of a social network system. In some implementations, the determining includes receiving an indication from a user who creates a group photo collection as to which other users are in the specified group of users. The method also includes receiving photos associated with the users, where the photos are received independently from each of the users. The method also includes providing an interface enabling the plurality of users to collaborate in creating the group photo collection, where the group photo collection includes the plurality of photos, and where the users have privileges to create, label, and modify photo albums in the group photo collection. The method also includes providing one or more recommendations to create a photo album based on one or more themes, where the one or more themes are based on patterns of objects recognized in the plurality of photos.

In another implementation, a system includes one or more processors, and logic encoded in one or more tangible media for execution by the one or more processors. When executed, the logic is operable to perform operations including: determining a plurality of users in a specified group of users of a social network system; receiving photos associated with the users; enabling the plurality of users to collaborate in creating a group photo collection, where the group photo collection includes the plurality of photos; and providing one or more recommendations to create a photo album based on one or more themes, where the one or more themes are based on patterns of objects recognized in the plurality of photos.

With further regard to this system, in some implementations, the determining of the plurality of users may include receiving an indication from a user who creates a group photo collection as to which other users are in the specified group of users. In some implementations, the logic when executed is further operable to perform operations including recommending users to be added to the specified group of users. In some implementations, the logic when executed is further operable to perform operations including enabling each user of the plurality of users to designate other users to be added to the specified group of users. In some implementations, the logic when executed is further operable to perform operations including providing an interface enabling the users to collaborate to create shared or common photo albums. In some implementations, the logic when executed is further operable to perform operations including enabling the users to collaborate to create shared or common photo albums, and where the users have privileges to create, label, and modify photo albums in the group photo collection. In some implementations, the logic when executed is further operable to perform operations including enabling the users to collaborate in order to cluster similar photos together in any one or more photo albums, enabling the users to order the photos, enabling the users to edit the photos, and enabling the users to add captions to the photos. In some implementations, the logic when executed is further operable to perform operations including recommending creating photo albums based on themes of color. In some implementations, the logic when executed is further operable to perform operations including recommending creating photo albums based on events.

DETAILED DESCRIPTION

Implementations described herein enable users to collaborate in creating a group photo collection. In some implementations, a system determines users of the social network system who are contributors to the group photo collection. The system receives photos associated with the users. For example, each of the users in a specified group of users may provide photos to the system. The system enables the users to collaborate in creating the group photo collection. In various implementations, the system may also recommend creating photo albums based on one or more factors. For example, the system may make recommendations to create photo albums based on themes, based on events, and/or based on time.

Figure 1:
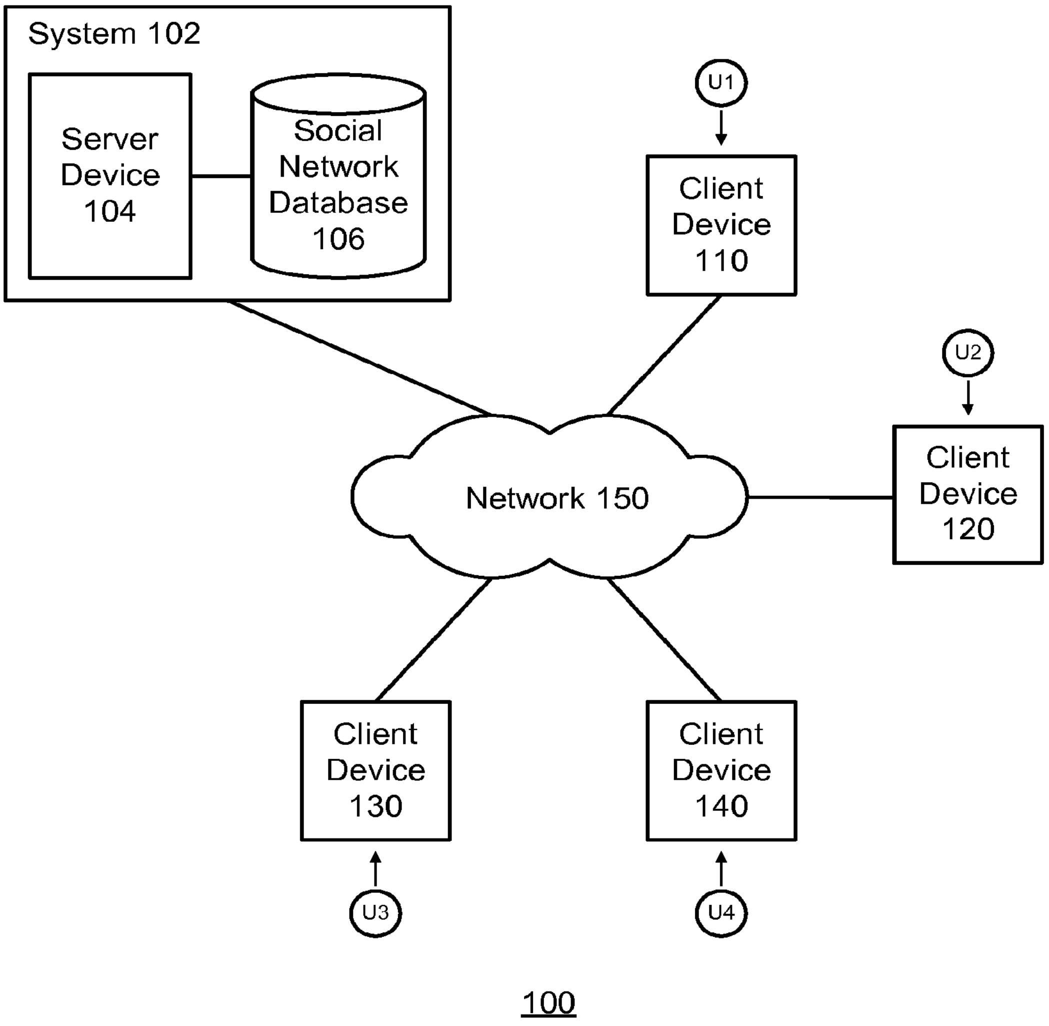
FIG. 1 illustrates a block diagram of an example network environment, which may be used to implement the embodiments described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may collaborate with each other in building a group photo collection using respective client devices 110, 120, 130, and 140.

Figure 2:
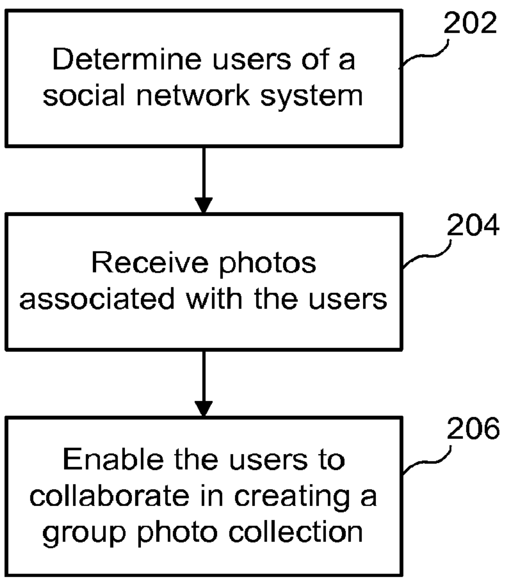
FIG. 2 illustrates an example simplified flow diagram for generating a group photo collection, according to some implementations.

FIG. 2 illustrates an example simplified flow diagram for generating a group photo collection, according to some implementations. In various implementations, system 102 may generate a group photo collection in a social network system, or anywhere visual media may be used and/or viewed. Referring to both FIGS. 1 and 2, a method is initiated in block 202, where system 102 determines a group of users in a specified group of users of the social network system who will collaborate to build a group photo collection. For example, users U1, U2, U3, and U4 may be collaborators in building the group photo collection. In some implementations, system 102 may receive an indication from a user who initiates or creates the group photo collection as to which other users are in the specified group of users. In some implementations, system 102 may recommend users to be added as collaborators based on social network commonalities (e.g., being social network friends, having similar interests, etc.).

In various implementations, a group photo collection may be a collection of photos, which may be arranged in one or more photo albums. The photos in the group photo collection are provided by different users in a specified group of users. The terms "users" and "collaborators" may be used interchangeably.

For ease of illustration, four example users U1, U2, U3, and U4 are described. There may be any number of users collaborating to build a group photo collection. Also, in some implementations, system 102 may enable users who are original designated collaborators to designate other users to be added as collaborators.

In block 204, system 102 receives photos associated with the users. For example, system 102 may receive one or more photos from each of users U1, U2, U3, and U4 via respective client devices 110, 120, 130, and 140.

In various implementations, system 102 may obtain photos independently from each of the users U1, U2, U3, and U4, where the photos obtained from different users need not be associated by any particular time period or event. For example, user U1 may contribute photos obtained from a wedding, user U2 may contribute photos a subsequent month from a family gathering, etc.

In block 206, system 102 enables the users to collaborate in creating the group photo collection, where system 102 enables the users to participate in a variety of collaborative tasks. For example, in some implementations, system 102 enables the users to pool photos, where the photos are to be included in the group photo collection. In various implementations, system 102 may provide an interface that enables the users to collaborate. In some implementations, the interface may be shared among multiple users, and may provide the users with access to photos that the users may use to collaborate in creating photo albums.

In some implementations, system 102 enables the users to collaborate in order to create shared or common photo albums, where the users have privileges to create, label, and modify photo albums in the group photo collection. For example, any of the users U1, U2, U3, and U4 may create a particular photo album, any of the users U1, U2, U3, and U4 may label the photo album, and any of the users U1, U2, U3, and U4 may modify the photo album.

In some implementations, system 102 enables users to collaborate to cluster similar photos together in any one or more photo albums, enables users to order the photos, enables users to edit the photos, enables users to delete photos, and enables users to add captions to the photos, etc. Users U1, U2, U3, and U4 may collaborate with each other in building a group photo collection using respective client devices 110, 120, 130, and 140. In various implementations, users U1, U2, U3, and U4, and any newly added collaborators may access and contribute to the group photo collection via network 150 and may curate photos from social network database 106.

In some implementations, system 102 may make recommendations to the users with regard to adding photos to particular photo albums in the group photo collection and with regard to creating and organizing photo albums. In various implementations, these recommendations may be based on one or more criteria.

In some implementations, system 102 may recommend creating photo albums based on events. For example, system 102 may detect that two or more users are attending the same event, in which case system 102 may recommend that the users add photos from the event to the group photo collection. In other words, system 102 may recommend a photo album having a particular event theme, etc. In various implementations, system 102 may perform recognition algorithms to determine which photos are related with respect to an event. For example, system 102 may determine that two or more of the collaborators are at a gathering (e.g., via a check-in, an event registration process, etc.). System 102 may also recognize two or more of the collaborators from photos captured at the event which were immediately uploaded to system 102. In some implementations, system 102 may determine that photos provided by the users are from the same event based on similar subject matter (e.g., people, landmarks, objects, etc.) and based on the photos being captured within the same time period (e.g., within several hours, during the same day, etc.).

For example, in some implementations, system 102 may recommend creating photo albums based on themes. In some implementations, system 102 may group the photos into photo albums based on the themes. As described in more detail below, such themes may involve various patterns of attributes and/or patterns of objects detected among photos.

In some implementations, system 102 may detect color themes, where a number of photos in the group photo collection may have a dominant color (e.g., blue, green, red, etc.). In some implementations, system 102 may use a recognition algorithm to detect patterns of one or more colors in multiple photos. Based on the detection of color patterns, system 102 may recommend grouping photos having the detected patterns of colors into one or more photo albums.

In some implementations, system 102 may detect other themes based on objects (e.g., pets, landmarks, etc.). System 102 may recommend grouping like photos into photo albums based on such themes. Example implementations for recognizing themes are described in more detail below. In some implementations, system 102 may use a recognition algorithm to detect patterns of one or more objects in multiple photos. Based on the detection of patterns of objects, system 102 may recommend grouping photos having the detected patterns of objects into one or more photo albums.

In some implementations, system 102 may associate themes of color and/or objects with various events. Such events may include, for example, special events such a weddings, graduation ceremonies, etc. In an example scenario, system 102 may detect a cake in multiple photos. System 102 may also detect the same two people in the same photo with the cake. System 102 may also detect a vale and dress on one of the two people. System 102 may also detect the words "wedding" or "marriage" or "ceremony" in one or more photos (e.g., "marriage ceremony" on a wedding invitation).

In some implementations, system 102 may apply location and/or time parameters when detecting themes. System 102 may determine time and location using time stamps and location identifications (e.g., place ID). For example, system 102 may detect themes in photos taken at a particular location. A combination of the location and themes may indicate a special event. For example, system 102 detecting a vale and a white dress on one person standing next to another person at a church may be indicative of a wedding ceremony. As such, system 102 may recommend including such photos in one or more photo albums (e.g., wedding photo album).

In some implementations, system 102 may detect themes in photos taken within a predetermined time period (e.g., a 48 hour window). Such time parameters indicate particular categories of events. For example, system 102 detecting the same group of people over smaller time period (e.g., 3 hours) may indicate a gathering or party depending on the size of the group. System 102 detecting the same group of people over a larger time period (e.g. 2 days) may indicate a reunion (e.g., family reunion). As such, system 102 may recommend including such photos in one or more photo albums.

In various implementations, system 102 enables users of the social network system to specify and/or consent to the use of personal information, which may include the system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use of using their photos for face matching and/or facial recognition in general. Example implementations for recognizing faces and other objects are described in more detail below.

In some implementations, system 102 may recommend creating photo albums based on locations. For example, system 102 may detect a particular location in various photos. System 102 may detect locations based on geotagging, landmark recognition, or any other suitable means. For example, user U1 visits a location such as Paris, France, and to capture a number of photos; and user U2 also visited Paris, France, and captures a number of photos. System 102 may detect the common location and recommend grouping photos captured at that location, even if the trips were unrelated or occurred at different times. For example, system 102 may recommend a photo album having a location theme, a travel theme, etc.

In some implementations, system 102 may recommend creating photo albums based on time. For example, system 102 may detect a number of photos captured during a particular time period such as a holiday (e.g., Thanksgiving Day, etc.) and may recommend making photo albums based on the time period. For example, system 102 may recommend a photo album having a holiday theme, etc.

In some implementations, system 102 may recommend creating photo albums having any combination of themes (e.g., color, event, location, time, etc.). For example, system 102 may detect that photos are associated with an event such as a wedding, and also detect particular clusters of photos that revolve around particular activities (e.g., exchange of wedding vows, cake cutting, etc.). System 102 may recommend photo albums based on a combination of any one or more of these activities.

In some implementations, system 102 may display the group photo collection in any number of locations. For example, system 102 may display the group photo collection in a single gallery on a group webpage that is separate from a particular user's personal webpage. System 102 may also display the group photo collection on an events webpage. System 102 may also display the group photo collection on one or more personal webpages of particular users.

In various implementations, system 102 may utilize a variety of recognition algorithms to recognize faces, themes, objects, etc. in photos. Such facial algorithms may be integral to system 102. System 102 may also access recognition algorithms provided by software that is external to system 102, and that system 102 accesses.

In various implementations, system 102 enables users of the social network system to specify and/or consent to using their faces in photos or using their identity information in recognizing people identified in photos. For example, system 102 may provide users with multiple selections for specifying and/or consenting to the use of personal information. For example, selections for specifying and/or consenting the use of personal information may be associated with individual photos, all photos, individual photo albums, all photo albums, etc. The selections may be implemented in a variety of ways. For example, system 102 may cause buttons or check boxes to be displayed next to various selections. In some implementations, system 102 enables users of the social network to specify and/or consent to the use their photos for face matching and/or facial recognition in general.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In various implementations, system 102 obtains reference images of users of the social network system, where each reference image includes an image of a face that is associated with a known user. The user is known, in that system 102 has the user's identity information such as the user's name and other profile information. In some implementations, a reference image may be, for example, a profile image that the user has uploaded. In some implementations, a reference image may be based on a stored composite of a group of reference images.

In some implementations, to recognize a face in a photo, system 102 may compare the face (i.e., image of the face) and match the face to reference images of users of the social network system. Note that the term "face" and the phrase "image of the face" are used interchangeably. For ease of illustration, the recognition of one face is described in some of the example implementations described herein. These implementations may also apply to each face of multiple faces to be recognized.

In some implementations, system 102 may search reference images in order to identify any one or more reference images that are similar to the face in the photo.

In some implementations, for a given reference image, system 102 may extract features from the image of the face in a photo for analysis, and then compare those features to those of one or more reference images. For example, system 102 may analyze the relative position, size, and/or shape of facial features such as eyes, nose, cheekbones, mouth, jaw, etc. In some implementations, system 102 may use data gathered from the analysis to match the face in the photo to one more reference images with matching or similar features. In some implementations, system 102 may normalize multiple reference images, and compress face data from those images into a composite representation having information (e.g., facial feature data), and then compare the face in the photo to the composite representation for face matching and/or facial recognition.

In various implementations, system 102 may utilize either face matching or facial recognition, or both, depending on the particular implementation. In various implementations, face matching need not recognize faces to know they belong to the same person. Face matching (also referred to as face clustering) associates two faces as belonging to the same person, without necessarily identifying who that person is. In various implementations, facial recognition associates an identity (e.g., a name) with a face using existing face templates that have been identified (e.g., named).

In some scenarios, the face in the photo may be similar to multiple reference images associated with the same user. As such, there would be a high probability that the person associated with the face in the photo is the same person associated with the reference images.

In some scenarios, the face in the photo may be similar to multiple reference images associated with different users. As such, there would be a moderately high yet decreased probability that the person in the photo matches any given person associated with the reference images. To handle such a situation, system 102 may use various types of face matching and/or facial recognition algorithms to narrow the possibilities, ideally down to one best candidate.

For example, in some implementations, to facilitate in face matching and/or facial recognition, system 102 may use geometric face matching and/or facial recognition algorithms, which are based on feature discrimination. System 102 may also use photometric algorithms, which are based on a statistical approach that distills a facial feature into values for comparison. A combination of the geometric and photometric approaches could also be used when comparing the face in the photo to one or more references.

Other face matching and/or facial recognition algorithms may be used. For example, system 102 may use face matching and/or facial recognition algorithms that use one or more of principal component analysis, linear discriminate analysis, elastic bunch graph matching, hidden Markov models, and dynamic link matching. It will be appreciated that system 102 may use other known or later developed face matching and/or facial recognition algorithms, techniques, and/or systems.

In some implementations, system 102 may generate an output indicating a likelihood (or probability) that the face in the photo matches a given reference image. In some implementations, the output may be represented as a metric (or numerical value) such as a percentage associated with the confidence that the face in the photo matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a face matching and/or facial recognition algorithms. Other similar recognition algorithms and/or visual search systems may be used to recognize objects such as landmarks, logos, entities, events, etc. in order to implement implementations described herein.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time.

While system 102 is described as performing the steps as described in the implementations herein, any suitable component or combination of components of system 102 or any suitable processor or processors associated with system 102 may perform the steps described.

Implementations described herein provide various benefits. For example, implementations enable multiple users to own and curate the same set of digital photos online or offline. Implementations described herein also increase overall engagement among end-users in a social networking environment.

Figure 3:
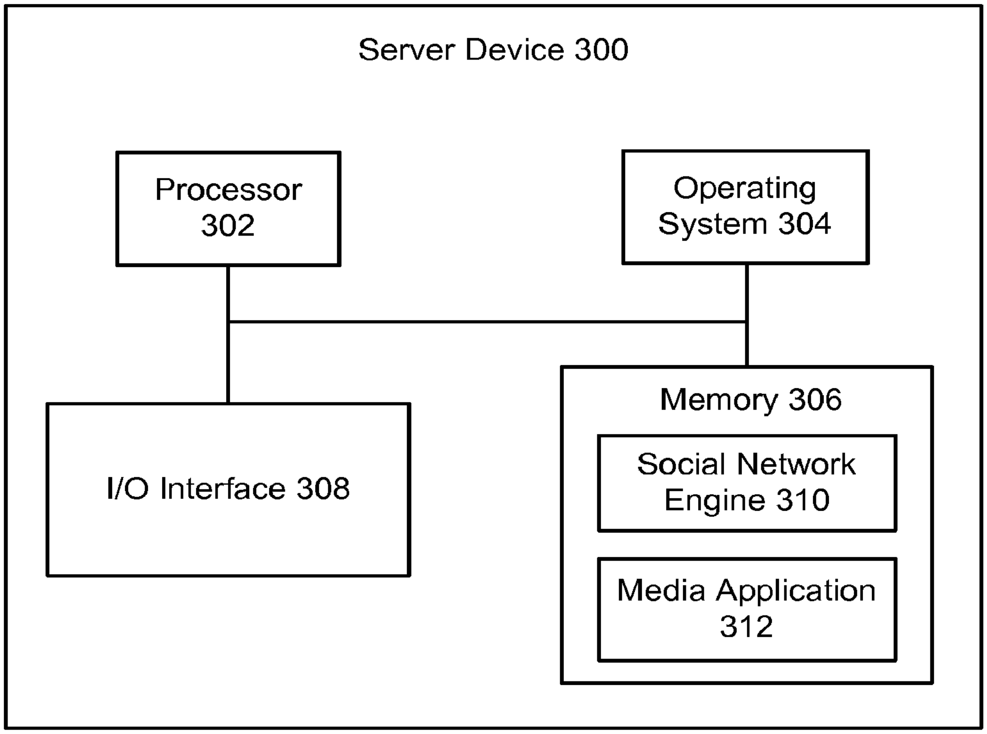
FIG. 3 illustrates a block diagram of an example server device, which may be used to implement the implementations described herein.

FIG. 3 illustrates a block diagram of an example server device 300, which may be used to implement the implementations described herein. For example, server device 300 may be used to implement server device 104 of FIG. 1, as well as to perform the method implementations described herein. In some implementations, server device 300 includes a processor 302, an operating system 304, a memory 306, and an input/output (I/O) interface 308. Server device 300 also includes a social network engine 310 and a media application 312, which may be stored in memory 306 or on any other suitable storage location or computer-readable medium. Media application 312 provides instructions that enable processor 302 to perform the functions described herein and other functions.

For ease of illustration, FIG. 3 shows one block for each of processor 302, operating system 304, memory 306, I/O interface 308, social network engine 310, and media application 312. These blocks 302, 304, 306, 308, 310, and 312 may represent multiple processors, operating systems, memories, I/O interfaces, social network engines, and media applications. In other implementations, server device 300 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:

receiving respective photos from a user device of each of a plurality of users;

providing a shared interface to each of the user devices to create a collaborative photo collection of a plurality of photos of the respective photos, wherein at least specific photos of the plurality of photos are associated with an event;

analyzing visual content of the respective photos using one or more visual content recognition algorithms or matching algorithms to detect a pattern of at least one of a color, at least one object, or at least one word in the respective photos;

determining one or more event themes of two or more of the specific photos of the plurality of photos based on the pattern of the at least one of the color, at least one object, or at least one word, determined to be in the specific photos, wherein the one or more event themes indicate a context for the visual content of the respective photos including one or more activities associated with the event;

determining an event category based, at least in part, on a time span of the two or more specific photos that are associated with the one or more event themes;

recommending to each of the plurality of users, to cluster, based on the event category, the two or more specific photos of the plurality of photos that are associated with the one or more event themes, into one or more photo clusters;

receiving at least one user input through the shared interface; and generating the collaborative photo collection that includes the one or more photo clusters, according to the at least one user input.

2. The method of claim 1, wherein the shared interface enables the plurality of users to label and modify the collaborative photo collection.

3. The method of claim 1, further comprising ordering the specific photos in the one or more photo clusters in the collaborative photo collection, based, at least in part, on the one or more event themes.

4. The method of claim 1, further comprising grouping the photo clusters according to the event.

5. The method of claim 4, wherein the event is determined based on a respective capture time of the specific photos in the photo clusters.

6. The method of claim 1, wherein the color includes at least one dominant color determined to be in the specific photos.

7. The method of claim 1, further comprising enabling each user of the plurality of users to add other users to the plurality of users.

8. A non-transitory computer-readable medium storing instructions that, when executed by one or more processors, cause the one or more processors to perform operations comprising:

receiving respective photos from a user device of each of a plurality of users;

providing a shared interface to each of the user devices to create a collaborative photo collection of a plurality of photos of the respective photos, wherein the shared interface enables the plurality of users to perform at least one of edit at least one photo of the plurality of photos, delete at least one photo of the plurality of photos, or provide captions for at least one photo of the plurality of photos, wherein at least specific photos of the plurality of photos are associated with an event;

analyzing visual content of the respective photos using one or more visual content recognition algorithms or matching algorithms to detect a pattern of at least one of a color, at least one object, or at least one word in the respective photos;

determining one or more event themes of two or more of the specific photos of the plurality of photos based on the pattern of the at least one of the color, at least one object, or at least one word, determined to be in the specific photos, wherein the one or more event themes indicate a context for the visual content of the respective photos including one or more activities associated with the event;

determining an event category based, at least in part, on a time span of the two or more specific photos that are associated with the one or more event themes;

recommending to each of the plurality of users, to cluster, based on the event category, the two or more specific photos of the plurality of photos that are associated with the one or more event themes, into one or more photo clusters by providing user input with the shared interface;

receiving at least one user input; and generating the collaborative photo collection that includes the one or more photo clusters, according to the at least one user input.

9. The computer-readable medium of claim 8, wherein the shared interface further enables the plurality of users to label and modify the collaborative photo collection.

10. The computer-readable medium of claim 8, wherein the operations further comprise ordering the specific photos in the one or more photo clusters in the collaborative photo collection, based, at least in part, on the one or more event themes.

11. The computer-readable medium of claim 8, wherein the operations further comprise grouping the photo clusters according to the event.

12. The computer-readable medium of claim 11, wherein the event is determined based on a respective capture time of the specific photos in the photo clusters.

13. The computer-readable medium of claim 8, wherein the color includes at least one dominant color determined to be in the specific photos.

14. The computer-readable medium of claim 8, wherein the operations further comprise enabling each user of the plurality of users to add other users to the plurality of users.

15. A system comprising:

one or more processors; and one or more computer-readable media having instructions stored thereon that, when executed by the one or more processors, cause performance of operations comprising:

receiving respective photos from a user device of each of a plurality of users;

providing a shared interface to each of the user devices to create a collaborative photo collection of a plurality of photos of the respective photos, wherein at least specific photos of the plurality of photos are associated with an event;

analyzing visual content of the respective photos using one or more visual content recognition algorithms or matching algorithms to detect a pattern of at least one of a color, at least one object, or at least one word in the respective photos;

determining one or more event themes of two or more of the specific photos of the plurality of photos based on the pattern of the at least one of color, at least one object, or at least one word, determined to be in the specific photos, wherein the one or more event themes indicate a context for the visual content of the respective photos including one or more activities associated with at least one respective event;

determining an event category based, at least in part, on a time span of the two or more specific photos that are associated with the one or more event themes;

recommending to each of the plurality of users, to cluster, based on the event category, the two or more specific photos of the plurality of photos that are associated with the one or more event themes, into one or more photo clusters by providing user input with the shared interface;

receiving at least one user input; and generating the collaborative photo collection that includes the one or more photo clusters, according to the at least one user input.

16. The system of claim 15, wherein the operations further comprise enabling each user of the plurality of users to add other users to the plurality of users.

17. The system of claim 15, wherein the operations further comprise ordering the specific photos in the one or more photo clusters in the collaborative photo collection, based, at least in part, on the one or more event themes.

18. The system of claim 15, wherein the operations further comprise grouping the photo clusters according to the event.

19. The system of claim 18, wherein the event is determined based on a respective capture time of the specific photos in the photo clusters.

20. The system of claim 15, wherein the color includes at least one dominant color determined to be in the specific photos.

* * * * *